United States Patent [19]

Cassidy et al.

[11] Patent Number: 5,504,124

[45] Date of Patent: Apr. 2, 1996

[54] PROCESS FOR REMOVING UNWANTED MATERIAL FROM WANTED MATERIAL

[75] Inventors: Edward F. Cassidy, Sart-Dames-Avelines; Gerhard J. Bleys, Heverlee, both of Belgium

[73] Assignee: Imperial Chemical Indutries PLC, London, England

[21] Appl. No.: 437,729

[22] Filed: May 9, 1995

[30] Foreign Application Priority Data

May 12, 1994 [GB] United Kingdom ............... 9409546

[51] Int. Cl.$^6$ ................ C08G 18/00; B01D 21/00
[52] U.S. Cl. ................ 521/53; 521/159; 521/174; 521/918; 210/767; 210/735; 210/702
[58] Field of Search ............... 521/53, 159, 174, 521/918; 210/702, 735, 767

[56] References Cited

U.S. PATENT DOCUMENTS 4,980,072  12/1990  Augustin et al. ............... 210/735

FOREIGN PATENT DOCUMENTS

| | | |
|---|---|---|
| 2057425 | 6/1992 | Canada . |
| 415127 | 8/1990 | European Pat. Off. . |
| 547765 | 6/1993 | European Pat. Off. . |
| 1944679 | 3/1971 | Germany . |
| 3315596 | 10/1984 | Germany . |
| 05329951 | 6/1992 | Japan . |
| 1170959 | 11/1969 | United Kingdom . |

*Primary Examiner*—Morton Foelak

[57] ABSTRACT

Process for removing unwanted material from wanted material containing water by bringing an isocyanate-containing prepolymer into contact with the materials, allowing the prepolymer to react with the water to form a flexible foam and removing the foam obtained from the wanted material.

5 Claims, No Drawings

PROCESS FOR REMOVING UNWANTED MATERIAL FROM WANTED MATERIAL

The present invention is concerned with a process for removing unwanted material from wanted material using a certain polymer.

In GB1170959 and U.S. Pat. No. 3,869,385 it has been described to spray formulations suitable for making polyurethane foam on water or sand in order to remove oil.

EP-370349 discloses the use of an isocyanate terminated prepolymer for removing hydrocarbons, in particular oil, by preparing a gel. Removal of the gel would be cumbersome since its strength is relatively weak. EP-370349 discloses the use of a prepolymer having an NCO value of 4.2% by weight which has been made from toluene diisocyanate and a polyether polyol which has been tipped with about 2% by weight of propylene oxide. DE3315596 discloses the use of polyurethane prepolymers, made from polyether polyols comprising 70–95% by weight of ethylene oxide units and polyisocyanates, as flocculating agents in order to clean water comprising industrial waste. The flocculated waste precipitates and would therefore be difficult to recover. Two prepolymers, having an NCO value of 7% by weight and which were made from a polyol comprising EO and PO units in a weight ratio of 75/25 and having a nominal functionality of 3 and a molecular weight of 4000, have been used; the one prepolymer having been made from toluene diisocyanate and the other from a 50/50 w/w mixture of 2,4'- and 4,4'-diphenylmethane diisocyanate. The amounts of prepolymer used are small.

EP-415127 also discloses the use of prepolymers as flocculating agents.

Surprisingly we have found that by using a certain amount of a special prepolymer, unwanted material may be removed from wanted material in the presence of water by bringing this prepolymer into contact with these materials. The prepolymer reacts with the water present and forms a flexible foam which foam comprises the unwanted material. The flexible foam may be removed easily from the wanted material.

Consequently the present invention is concerned with a process for removing unwanted material from wanted material in the presence of water by bringing an isocyanate-containing prepolymer into contact with the materials, allowing the prepolymer to react with at least part of the water to form a flexible foam and removing the foam obtained from the wanted material, the prepolymer having an NCO value of 5–10% by weight and being the reaction product obtained by reacting an excessive amount of a polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the amount of prepolymer used being 5 to 200 parts by weight per 100 parts by weight of unwanted material.

Although other materials may be used together with the prepolymer, it is preferred to use the prepolymer without additional material in the process according to the present invention.

Unwanted material in the context of the present application is a material which is in contact with another material—the wanted material—and which is regarded as a pollutant of the wanted material and which therefore is to be removed or separated from said wanted material.

Wanted material is the material from which the unwanted material is to be removed or separated.

Combinations of unwanted/wanted material are for instance oil/water, paint/water, ink/water, oil/wet sand (beach), oil/wet rocks and other petroleun products/water.

In particular the process is useful for removing oil or other water insoluble hydrocarbons from water.

In case the wanted material is not water it should comprise sufficient water to allow the prepolymer to react. In general the amount of water should be at least 20 parts by weight per 100 parts by weight of prepolymer applied. If the amount of water is less, water should be added; in general an amount of added water of 20 to 500 and preferably 40 to 400 parts by weight per 100 parts by weight of prepolymer applied will be sufficient. The amount of prepolymer used may range from 5 to 200, preferably from 10 to 100, most preferably from 20 to 80 parts by weight per 100 parts by weight of unwanted material. In practice the amount of unwanted material may be estimated. If the amount was estimated too low the process may be repeated and if the amount was estimated too high some additional foam is formed.

The prepolymer may be brought into contact with the materials in any known way, e.g. spraying, pouring and whipping. If desired, the prepolymer may be mixed with the materials. If desired, the prepolymer is brought into contact with the materials as a froth, which is obtained by adding steam, water or an inert gas, like $CO_2$ or air, to the prepolymer e.g. via the spray nozzle. Further if desired the prepolymer may be applied together with a diluent like an ester plasticizer, e.g. a phthalate, and propylene carbonate. The prepolymer is allowed to react preferably under ambient conditions. The process can even be applied at low ambient temperature, as long as sufficient—liquid—water is present. The prepolymer reacts with at least part of the water, depending on the amount of water available. At sea the prepolymer—of course—reacts with only a minor portion of the water. When only a limited amount, e.g. 20 parts of water per 100 parts of prepolymer, is available, all water may be used in the reaction. In general the reaction is complete in 1 to 15 minutes. The foam obtained contains unwanted material: it is included, absorbed and/or adsorbed. The flexible foam then is removed from the wanted material in any known way. It may be taken or pulled from the wanted material and subsequently dried and cut into smaller pieces and/or compressed. The collected foam, after drying preferably, suitably is used for energy recovery.

The polyisocyanate used in making the prepolymer may be selected from polymethylene polyphenylene polyisocyanates comprising at least 25, preferably at least 50 and most preferably at least 85% by weight of 4,4'-diphenylmethane diisocyanate (4,4'-MDI) or a liquid variant thereof. Preferably the polyisocyanate has an isocyanate functionality of 2.0 to 3, more preferably 2.0 to 2.3, most preferably 2.0 to 2.1.

In the context of the present invention the term polymethylene polyphenylene polyisocyanates includes diphenylmethane diisocyanates and oligomers thereof, known in the art as crude or polymeric MDI, having an isocyanate functionality of greater than 2.

The polyisocyanate may consist essentially of pure 4,4'-diphenylmethane diisocyanate or mixtures of this diisocyanate with other diphenylmethane diisocyanate isomers, for example the 2,4'-isomer optionally in conjunction with the 2,2'-isomer. The polyisocyanate may also be an MDI variant derived from a polyisocyanate composition containing at least 25%, preferably at least 50% and most preferably at least 85% by weight of 4,4'-diphenylmethane diisocyanate. MDI variants are well known in the art and, for use in accordance with the invention, particularly include liquid products obtained by introducing uretonimine and/or carbodiimide groups into said polyisocyanates, such a carbodiimide and/or uretonimine modified polyisocyanate preferably having an NCO value of at least 25% by weight, and/or by reacting such a polyisocyanate with one or more polyols having a hydroxyl functionality of 2–6 and a molecular weight of 62–1000 so as to obtain a modified polyisocyanate, preferably having an NCO value of at least 25% by weight. The polyisocyanate may comprise minor amounts of polymethylene polyphenylene polyisocyanates having an isocyanate functionality of greater than 2; this amount preferably is such that the isocyanate functionality of the total polyisocyanate is 2.0 to 3, more preferably 2.0 to 2.3, most preferably 2.0 to 2.1.

The polyol used in preparing the prepolymer preferably has an average nominal hydroxyl functionality of 2.5–3.5, a number average hydroxyl equivalent weight of 1000–3000 and an oxyethylene content of from 50 to 85% by weight. The polyether polyols used in preparing the prepolymer include products obtained by the polymerisation of ethylene oxide optionally together with another cyclic oxide like tetrahydrofuran and— preferably—propylene oxide in the presence of polyfunctional initiators. Suitable initiator compounds contain a plurality of active hydrogen atoms and include water, butanediol, ethylene glycol, propylene glycol, diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol and pentaerythritol. Mixtures of initiators may be used.

The polyol may be obtained by the simultaneous or sequential addition of ethylene oxide and the other cyclic oxide to the initiator. The sequential addition may be conducted in any order. Sequential addition will give polyols of the so called block copolymer type. Simultaneous addition will give polyols of the so called random type. Most preferred are random polyoxyethylene polyoxypropylene polyols having an oxyethylene content of 50 to 85% by weight.

In order to obtain the preferred polyol having an average nominal hydroxyl functionality of 2.5 to 3.5 a polyol having a nominal hydroxyl functionality of 3 may be used or a mixture of polyols, which may have another average nominal hydroxyl functionality provided the mixture is in the above 2.5–3.5 functionality range.

The term "average nominal hydroxyl functionality" is used herein to indicate the average functionality (number of hydroxyl groups per molecule) of the polyol on the assumption that the average functionality of the polyoxyalkylene polyols present therein is identical with the average functionality (number of active hydrogen atoms per molecule) of the initiator(s) used in their preparation although in practice it will often be somewhat less because of some terminal unsaturation.

The prepolymer is prepared conventionally by reacting the polyisocyanate and the polyol at relative amounts so as to obtain an NCO value of 5–10% by weight at a temperature preferably between 40° and 100° C. The prepolymers so prepared are liquid at ambient conditions. The polyisocyanates, polyols, prepolymers and ways to prepare them are known as such; see e.g. EP-547765. The stability of the prepolymer may be improved by adding a minor amount of an organic or Lewic acid, like e.g. benzoyl chloride, thionyl chloride and paratoluene sulphonic acid.

The present invention is illustrated by the following examples.

Example 1

A prepolymer was prepared by reacting 30 parts by weight of 4,4'-MDI and 70 parts by weight (pbw) of an EO/PO polyol having a molecular weight of 4000, a nominal functionality of 3 and EO content of 75% by weight (random). The NCO-value of the prepolymer was 7.8% by weight (prepolymer 1).

A number of 250 ml glass flasks were filled with 120 ml water followed by 2 g of used motor oil. The flasks were thoroughly shaken to mix the water and the oil. Then an amount of the above prepolymer was added. The flasks were shaken again vigorously for 2–3 seconds. A layer of flexible foam formed on top of the water. The foam was taken from the water after 1–3 minutes. The amount of prepolymer used, the type of water used and the quality of the water after the flexible foam was removed are in the following table.

| TYPE OF WATER | AMOUNT OF PRE-POLYMER (GRAMS) | QUALITY OF WATER |
| --- | --- | --- |
| Tap | 0.24 | some oil in emulsion |
| Tap | 0.4 | some oil in emulsion |
| Tap | 0.5 | no oil visible |
| Tap | 0.9 | no oil visible |
| Tap | 1.6 | no oil visible |
| Sea | 1.3 | no oil visible |

In all cases a small amount of white precipitate was observed in the water after the foam was removed. It is believed that this precipitate is not reactive anymore and is environmentally not harmful and that it contains a substituted urea which resulted from a reaction of a reaction product of the MDI and water with additional MDI which did not contribute to the flexible foam formation.

Example 2

Prepolymers having an NCO value of 7.8% by weight were prepared from the polyol used in example 1 and toluene diisocyanate (prepolymer 2) and a 50/50 w/w mixture of 4,4'-MDI and 2,4'-MDI (prepolymer 3). The prepolymers were prepared as in example 1. The oil-removal experiment of example 1 was repeated with 150 ml of water, 10 g of used motor oil and varying amounts of different prepolymers. The amounts and type of prepolymer and the results are given in the following table.

| PRE-POLYMER | AMOUNT (GRAMS) | RESULT |
| --- | --- | --- |
| 1 | 2.5 | no oil visible in water; flexible foam formed which contained oil |
| 2 | 2.5 | loose pieces of polymer formed; no flexible foam formed |
| 3 | 2.5 | no oil visible in water; flexible foam formed which contained the oil |
| 1 | 0.15 | flexible foam of weak strength; some oil visible in water |
| 3 | 0.15 | flexible foam of weak strength; most of the oil visible in water |
| 1 | 0.015 | porous cake; most of the oil in water |
| 3 | 0.015 | loose pieces of foam; most of the oil in the water |

The tests with prepolymer 2 and with amounts of 0.15 and 0. 015 grams are comparative tests.

We claim:

1. Process for removing unwanted material from wanted material in the presence of water by bringing an isocyanate-containing prepolymer into contact with the materials, allowing the prepolymer to react with at least part of the water to form a flexible foam and removing the foam obtained from the wanted material, the prepolymer having an NCO value of 5–10% by weight and being the reaction product obtained by reacting an excessive amount of polymethylene polyphenylene polyisocyanate comprising at least 25% by weight of 4,4'-diphenylmethane diisocyanate or a liquid variant thereof with a polyether polyol having an average nominal hydroxyl functionality of from 2 to 4, a number average hydroxyl equivalent weight of from 500 to 3000, and an oxyethylene content of at least 50% by weight, the amount of prepolymer used being 5 to 200 parts by weight per 100 parts by weight of unwanted material.

2. Process according to claim 1 wherein the amount of prepolymer is 10 to 100 parts by weight per 100 parts by weight of unwanted material.

3. Process according to claim 1 wherein the polyisocyanate comprises at least 85% by weight of 4,4'-diphenylmethane diisocyanate or a liquid variant thereof.

4. Process according to claim 1 wherein the polyol has an oxyethylene content of 50 to 85% by weight.

5. Process according to claim 1 wherein the polyol is a random polyoxyethylene polyoxypropylene polyol.

* * * * *